US00RE39170E

(19) United States
(12) Reissued Patent
Wagner et al.

(10) Patent Number: US RE39,170 E
(45) Date of Reissued Patent: Jul. 11, 2006

(54) VEHICLE PARKING SECURITY DEVICE

(76) Inventors: Mark Harrison Wagner, 25 Arglye Road, East Kew (AU); David Stratton, 8 Cowper Street, Sandringham (AU)

(21) Appl. No.: 10/915,682

(22) Filed: Aug. 10, 2004

Related U.S. Patent Documents

Reissue of:
(64) Patent No.: 6,398,452
Issued: Jun. 4, 2002
Appl. No.: 09/206,569
Filed: Dec. 7, 1998

U.S. Applications:
(63) Continuation of application No. PCT/AU97/00358, filed on Jun. 6, 1997.

(30) Foreign Application Priority Data

Jun. 7, 1996 (AU) ..... PO0287
Jun. 4, 1997 (AU) ..... PO7163

(51) Int. Cl.
*E01F 13/00* (2006.01)

(52) U.S. Cl. ..... 404/6; 404/9; 404/10; 49/49

(58) Field of Classification Search ..... 404/6, 404/9, 10; 49/49
See application file for complete search history.

(56) References Cited

U.S. PATENT DOCUMENTS 4,158,514 A * 6/1979 Dickinson ..... 404/6
4,715,742 A * 12/1987 Dickinson
4,974,991 A * 12/1990 Mandavi ..... 404/6
5,299,882 A * 4/1994 Sayers ..... 404/6
5,509,753 A * 4/1996 Thompson ..... 404/6
5,704,730 A * 1/1998 Burton-Chambers ..... 404/6
5,890,832 A * 4/1999 Soleau ..... 404/6

FOREIGN PATENT DOCUMENTS

| | | | |
|---|---|---|---|
| EP | 235548 | * | 9/1987 |
| EP | 373084 | * | 6/1990 |
| EP | 571305 | * | 11/1993 |
| FR | 2620625 | * | 4/1989 |
| FR | 2621625 | * | 4/1989 |
| GB | 2245296 | * | 1/1992 |
| WO | WO92/06247 | * | 4/1992 |
| WO | 92/06247 | * | 4/1992 |

* cited by examiner

*Primary Examiner*—Thomas H. Will
*Assistant Examiner*—Raymond W. Addie
(74) *Attorney, Agent, or Firm*—McCarry Bair PC

(57) ABSTRACT

A security device (2) is described for protection access to and from a parking space by being suitable for secure mounting to the entrance/exit of the parking space at ground level comprising a barrier or sign (9) capable of movement between a raised position for preventing movement of a vehicle past the barrier (9) and a lowered position permitting the vehicle to be driven over the device (2), and arming pedal (4) which is depressed when the vehicle is driven over the device (2) to energize a driving means in the form of a torsion spring (78) which is connected via a control means including a cam (40) having two cam lobes (42,44) for effecting movement of a bar (60), to the barrier (9) by a suitable connection means, such as for example a slotted wheel (84) and pulley arrangement, so that operation of the control means causes lower or raising of the barrier.

22 Claims, 8 Drawing Sheets

VEHICLE PARKING SECURITY DEVICE

Matter enclosed in heavy brackets [ ] appears in the original patent but forms no part of this reissue specification; matter printed in italics indicates the additions made by reissue.

This application is a continuation of International Application No. PCT/AU97/00358 filed Jun. 6, 1997.

BACKGROUND OF THE INVENTION

1. Field of the Invention

The present invention relates generally to a device and method of use of a device for preventing passage of a vehicle. More particularly, the present invention relates to a device and method of use of a device for preventing the entry and/or exit of a vehicle to and from an unauthorized area. More particularly the present invention relates to a barrier and to a method of using the barrier for preventing unauthorized use of a vehicle parking space and/or unauthorized removal of a vehicle from a parking space.

2. Related Art

Although the present invention will be described with particular reference to a security device and to methods of use of the device for preventing unauthorized use of a car parking space and/or unauthorized removal of a car from a parking space, it is to be noted that the scope of the present invention is not so limited but rather the scope of the present invention is broader so as to include other types of barrier devices and uses of the devices other than specifically described in the present specification.

Further, it is to be noted that the scope of the present invention is not limited to barrier devices for cars but includes other wheeled vehicles such as bicycles, motorcycles or the like and larger vehicles such as tractors, lorries, trucks and buses. Furthermore the scope of the present invention is not limited to preventing unauthorized use of a car parking space and/or unauthorized removal of a car from a parking space but includes prevention of unauthorized entrance to or exit from or movement along a driveway or entrance such as the driveway or entrance of a car park, parking station, parking building and the like.

The rapid increase in vehicle usage around the world has concomitantly increased parking pressure in most cities. The increasing housing density in many areas has further exacerbated parking problems. At certain times of day, on street parking is at a premium and there is pressure on the availability of existing parking spaces in public and private car parks and parking buildings. Parking can be particularly problematic for those who need to come and go from a place of business in a city throughout the day because each time they return to their place of business they often have to spend a considerable amount of time searching for a parking place.

Accordingly companies often rent or buy parking places to reserve for their staff. Usually these reserved parking places are located in car parks or parking buildings, in which the balance of the parking places are available to the public. Some businesses such as restaurants also reserve parking places for their customers and the continued prosperity of the restaurant may depend on customers having access to the reserved parking places.

Reservation of parking spaces is an attractive proposition for commercial car park and parking building owners because they can demand high prices for sole or exclusive use of such spaces. Consequently the owners will try to obtain as many reserved bookings as possible. Difficulties arise as the proportion of reserved parking places in the car park or parking building increases, concomitantly reducing the parking places available to the public. This frequently leads to members of the public using reserved parking places either through ignorance or indifference.

Furthermore many members of the public will park in any space available irrespective of whether they are parking illegally and/or on private property or in a public area. Often scant attention is paid to signs warning against parking in a particular area or indicating that a parking place is reserved for a particular person or vehicle. Often drivers resort to a variety of means to gain unauthorized entry to parking lots, parking buildings or public areas in an effort to find a parking place and/or avoid paying for use of the parking place.

Many efforts have been made in the past to counter the unauthorized use of parking places or unauthorized entry of vehicles to parking areas or parking buildings. In some areas, the problem of unauthorized parking has become so serious that vehicles parked without authorization have been towed away and impounded, often leading to damage of the vehicle and occasioning legal action. Morecommonly, efforts have been made to prevent vehicles entering individual parking places or car parks or parking buildings by placing a boom barrier or locking gate at the entry or exit of the parking areas and parking buildings. The boom or gate is often automatically activated by a magnetic card or manually activated by a parking supervisor. The entry and exit driveways or approaches of some parking areas and parking buildings are fitted with a low wall, a row of metal spikes or a similar obstacle which retracts into a recess in the driveway upon receiving an appropriate signal from a parking supervisor, magnetic card or the like. While these methods and devices for stopping unauthorized entry and exit to and from car parks and parking buildings are quite effective, they are usually not foolproof and they cannot be used to protect individual parking spaces within the parking building or car park. Furthermore if the device breaks down or malfunctions, potentially hundreds of people can be inconvenienced by being prevented from entering or leaving the car park or parking building.

Individual parking places are sometimes secured from unauthorized use by manually operated devices. These manually operated devices include a hinged metal hoop (or pair of hoops) secured to the ground by bolts drilled into the surface of the parking place. The hinge allows the hoop(s) to lie flat on the ground when not in use. In use, the driver raises the hoop(s) and physically secures the hoop(s) into place by means of a padlock or some other locking device. When raised and locked into place, the profile of the hoop or pair of hoops is sufficiently high and wide to prevent a vehicle from being driven around or over the hoop. Accordingly an unauthorized driver cannot drive into the empty parking place when the hoop or pair of hoops are raised and locked in place. An authorized driver, having parked his vehicle in the parking place may subsequently raise and lock the hoop in place to prevent unauthorized removal of the car as an additional way of protecting the car from theft. The principal disadvantage of such hoops is that they require manual operation and are thus most suited for use on parking places for long term parking; the hoops are extremely unsuitable for parking places which are used on a regular basis because the user must constantly get in and out of their vehicle to manually raise and lower the hoop. Consequently the metal hoops are particularly inconvenient for use by the elderly or disabled. Additionally, it is not always possible to temporarily stop a vehicle in a roadway or similar approach to the particular parking place while the driver gets out of the vehicle to lower the hoops to allow access to the parking space.

Another device and method of the prior art for securing a vehicle parking place involves the use of a pole or post which is attached to the ground by a hinge at the base. In use it is manually raised to a vertical position and locked into place and accordingly it suffers from the same disadvantages as the hoops described above. Furthermore the profile of the pole is so narrow that very small vehicles or motorcycles may be driven around it to occupy a vacant parking place, such as for example by driving between two adjacent posts protecting two adjacent parking places and parking the vehicle spanning two adjacent parking places.

In order to overcome the disadvantages of prior art devices for securing a vehicle parking place, efforts have been made to provide automated devices. For example, one such device marketed under the trade name SECURAPARK comprises an oval metal loop and flat crossbar attached by a hinge to the ground. An external power source provides power to raise and lower the oval metal loop. One of the disadvantages of this type of system is that both the raising and lowering of the metal loop requires power from the external power source and consequently frequent replacing or recharging of the battery is required or main power must be supplied to the unit necessitating electrical wiring.

A further disadvantage suffered by the SECURAPARK device and other devices of the prior art is that special skills are required for their installation and in general it is necessary to carry out external works on a site prior to their installation. For example, the SECURAPARK device and the hoops and poles described above must be physically secured to the parking place by way of bolts, hence in certain cases it may be necessary to cast a special concrete section to accept the bolts. Automated boom gates and the like require highly specialized skills for their installation and electrical wiring. Where specialists are required to install such devices, the overall cost of each unit is increased.

Therefore there is a need to provide a device and method of use of a device for preventing passage or movement of a vehicle, which device can be remotely operated from the car without having to leave the car, and which is readily installed by the person of average mechanical skills. More particularly there is a need to provide a device and method of use of a device for preventing unauthorized use of a vehicle parking place and optionally for preventing unauthorized removal of a vehicle once parked in a parking place.

SUMMARY OF THE INVENTION

It is an aim of the present invention to provide a device and method of use of a device to prevent the passage or movement of a vehicle into or out of an unauthorized area such as a parking place which at least alleviates one or more of the problems of existing devices.

According to one aspect of the present invention there is provided a security device adapted to control movement of a vehicle to and from a designated parking area comprising:

- a barrier capable of movement between a first position for preventing movement of a vehicle past a barrier and a second position for allowing movement of a vehicle past the barrier;
- a controller for selectively controlling operation of the barrier between the first and second positions;
- a driver for effecting movement of the barrier from the second position to the first position in response to a selective operation of a controller; and
- an arming device for arming the driver to effect movement of the barrier from the second position to the first position in response to selective operation of the controller when the arming device is in the armed condition. The arming device is movable from a unarmed position to the armed position to arm the driver by movement of the vehicle over the security device.

A first operation first operation of the controller causes the driver to move the barrier from the second position to a first position substantially simultaneously with the arming device moving from the armed position to the unarmed position. Thus, the arming device is disarmed. A second operation of the controller allows the barrier to move from the first position to the second position while the arming device remains in the unarmed position. Movement of the vehicle over the security device when the arming device is in the unarmed position [moves the barrier] *arms the driver* for future movement *of the barrier* from the second position to the first position.

Typically, the security device is capable of adopting a number of conditions in use. They include:

- a first condition where the barrier and the arming means are both in raised positions thereby preventing movement of the vehicle past the barrier,
- a second condition where the barrier is lowered while the arming device is raised thereby allowing movement of the vehicle past the barrier; and
- a third condition where the barrier and arming device are both lowered so that passage of the vehicle over the security device when in the second condition arms the arming device by lowering the arming device which thereby arms the driver in readiness for movement of the barrier to the raised position in response to the first operation of the controller. In that case, the arming device remains in the lowered position pending movement of the barrier to the raised position for movement to the first condition.

According to another aspect of the present invention there is provided a method of preventing the passage of a vehicle by locating the device of the current invention in the pathway of a vehicle.

According to another aspect of the present invention there is provided a method of preventing unauthorized entry to a parking place, parking area, parking building or the like by locating the device of the current invention at the entry or exit of the parking place, parking area, parking building or the like.

Typically, the arming means of the present invention is an arming pedal, lever, arm, plate or the like. More typically, the arming means of the device of the present invention comprises a biasing means which acts to raise the arming pedal. Typically, the biasing means is a spring or the like, such as a compression spring, torsion spring or the like. Typically, the arming means, moves between lowered and raised positions by rotation about an axle. More typically, the biasing means is either attached to the axle and acts to rotate the arming means about the axle, or is located on a separate axle such as a stub axle. Where the biasing means is a coil spring, the coils of the spring may be wound around the axle.

Typically, the arming means is moved from the raised position to the lowered position by the passage of a vehicle tire or similar over the arming means. Where the biasing means is a spring, the energy expended by the passage of the vehicle tire over the arming means compresses the biasing means to a tensioned position in which it is retained until it is released to raise the arming means. When the biasing moans in compressed in this way the arming means is said to be "armed".

Typically, the spring, particularly the torsion spring, is the driver as well as the biasing means for the arming means. More typically, the spring causes the barrier to raise simultaneously with the arming means returning to its raised position in response to the first selective operation of the controller.

Typically, the arming means is of a shape that can be easily depressed when contacted by a rotating vehicletire, such as when the vehicle drives over the device of the present invention.

Typically, the arming means comprises a plate of about 75 millimeters when raised, and 400 to 800, preferably 750, millimeters in width. More typically, the arming means comprises a plate having a curved profile so that in the lowered positions the plate can be easily traversed by a vehicle tire without causing undue hindrance to the passage of the vehicle.

Typically, the barrier is a plate, shield, sign or the like barrier and is of suitable size and dimensions that a vehicle cannot drive over the barrier when it is raised because the barrier will contact the fender, axles, differential or other parts of the vehicle damaging them or opposing movement of the vehicle. Typically, the barrier comprises a plate of 350 to 450 millimeters in height when raised and 700 to 800 millimeters in width. More typically, the barrier comprises a plate having a curved profile in the upstanding or transverse direction so that in the lowered position it forms a hump which can be readily traversed by a vehicle tire. Even more typically, the barrier in the lower position adopts the same or a similar profile to the arming means when in the raised position.

Typically, the barrier moves between lowered and raised positions by rotation about an axle. Typically, the arming means is adjacent the barrier and a releasable connecting means or control means connects the arming means and the barrier such that they can rise in unison. Typically, the connecting means acts to connect the arming means and the barrier such that when the biasing means acts to raise the barrier by operation of the driver, the arming means is also raised. More typically, the barrier and the arming means are connected to the same axle or are connected to separate axles.

Typically, when the barrier and arming means are both in the raised position the barrier and/or arming means is held in this position by a locking means. The locking means prevents movement of the barrier from raised to lowered position.

Typically, when the barrier and arming means are both in the raised position, release of the connecting means and the locking means allows the barrier to move from the raised position to the lowered position. Typically, the barrier moves to the lowered position under the effect of gravity in a regulated manner. More typically, the rate of movement is regulated by friction, preferably associated with the barrier. Typically, when the barrier reaches the fully lowered position the barrier engages a releasable barrier retaining means or merely rests on the chassis of the device or on the substrate on which the device is located.

While the barrier moves from the raised to the lowered position, the arming means remains in the raised position under the influence of the biasing means.

When the arming means is returned to its lowered position by the passage of a vehicle tire, the connecting means is engaged or activated, reconnecting the barrier to the arming means.

The barrier and arming means are thus reconnected and as long as the barrier retaining means retains the barrier, the arming means is also retained and the biasing means kept under tension.

Accordingly, release of the barrier retaining means releases the tension in the biasing means, and the biasing means acts to raise the arming means and the barrier.

Typically, the barrier retaining means comprises a lock, latch, spring biased pin or the like which is engaged when the barrier reaches the lowered position or when the arming pedal is depressed and which is released manually or remotely. Typically, the barrier retaining means is released automatically upon initiation by a signal from a remote control device, magnetic card or the like. More typically, the barrier retaining means is released automatically upon initiation of a solenoid switch by a remote control device. For example, when a driver wishes to stop unauthorized vehicles parking in a parking place, a button of a remote control device can be pressed to emit a signal which releases the barrier retaining means thus allowing the barrier and arming pedal to move to the raised position under the influence of the biasing means, thus preventing unauthorized use of the parking space.

Typically, the releasable connecting means for connecting the barrier and the arming pedal comprises a lock, latch, spring biased pin or the like which is immediately engaged when the arming means reaches the lowered position and which can be released automatically. Typically, the barrier retaining means is released automatically upon initiation by a signal from a remote control device, magnetic card or the like. More typically, the connecting means is released automatically upon initiation of a solenoid switch by a remote control device.

Typically, the locking means is also a latch, lock or spring biased pin or the like which engages the barrier means and/or arming means when they are in the raised position. Typically, the locking means is released automatically upon initiation by a signal from a remote control device, magnetic card or the like. More typically, the same initiation signal releases either or both of the connecting means and the locking means.

If a driver needs to drive into a parking place protected by the raised barrier and arming means, a button on a remote control device can be pressed, releasing the connecting means and locking means so that the barrier falls to the lowered position and engages the barrier retaining means. The driver can then drive over the arming means, the vehicle tire pushing the arming means into the lowered position and re-engaging the connecting means so that both the barrier and the arming means are retained in the lowered position.

Typically, the device of the current invention comprises a chassis or framework an which the arming means and barrier are mounted to form an assembly. Typically, the chassis comprises a frame and end plates which bear the axles for the barrier and arming pedal. Typically, the chassis will further comprise a covering means such as a coating or veneer of highly visible paint or similar or a rubbery composition which in attached over sharp edges and corners of the chassis. The rubbery composition not only gives the device a pleasing streamlined appearance but prevents vehicle tires being cut or damaged as they pass over the device of the current invention, and allows the barrier to retract fully without presenting a step or other hindrance to the progress of the vehicle.

Typically, the chassis is bolted, glued or otherwise attached to the ground or floor of the parking station etc.

More typically, the chassis is supported on foot plates which are bolted or glued to the ground or floor, providing a relatively easy mode of installation of the device of the current invention. Accordingly the foot plates may be retained in place on the ground by bolts, spikes or any other suitable retaining means known to the person skilled in the art.

Typically, the controller of the present invention includes a cam arrangement, preferably a cylindrical cam arrangement, preferably having two cam lobes. More typically, the first of the cam lobes controls movement of the barrier from the raised position to the lowered position whereas the second of the cam lobes controls movement of the barrier from the lowered position to the raised position along with controlling movement of the arming means from the lowered position to the raised position and releasing the driver means. Even more typically, the controller includes a pawl and ratchet arrangement in the form of a shoulder and T-bar for cooperatively engaging with one another.

DETAILED DESCRIPTION

Figures 1A, 1B, 1C:
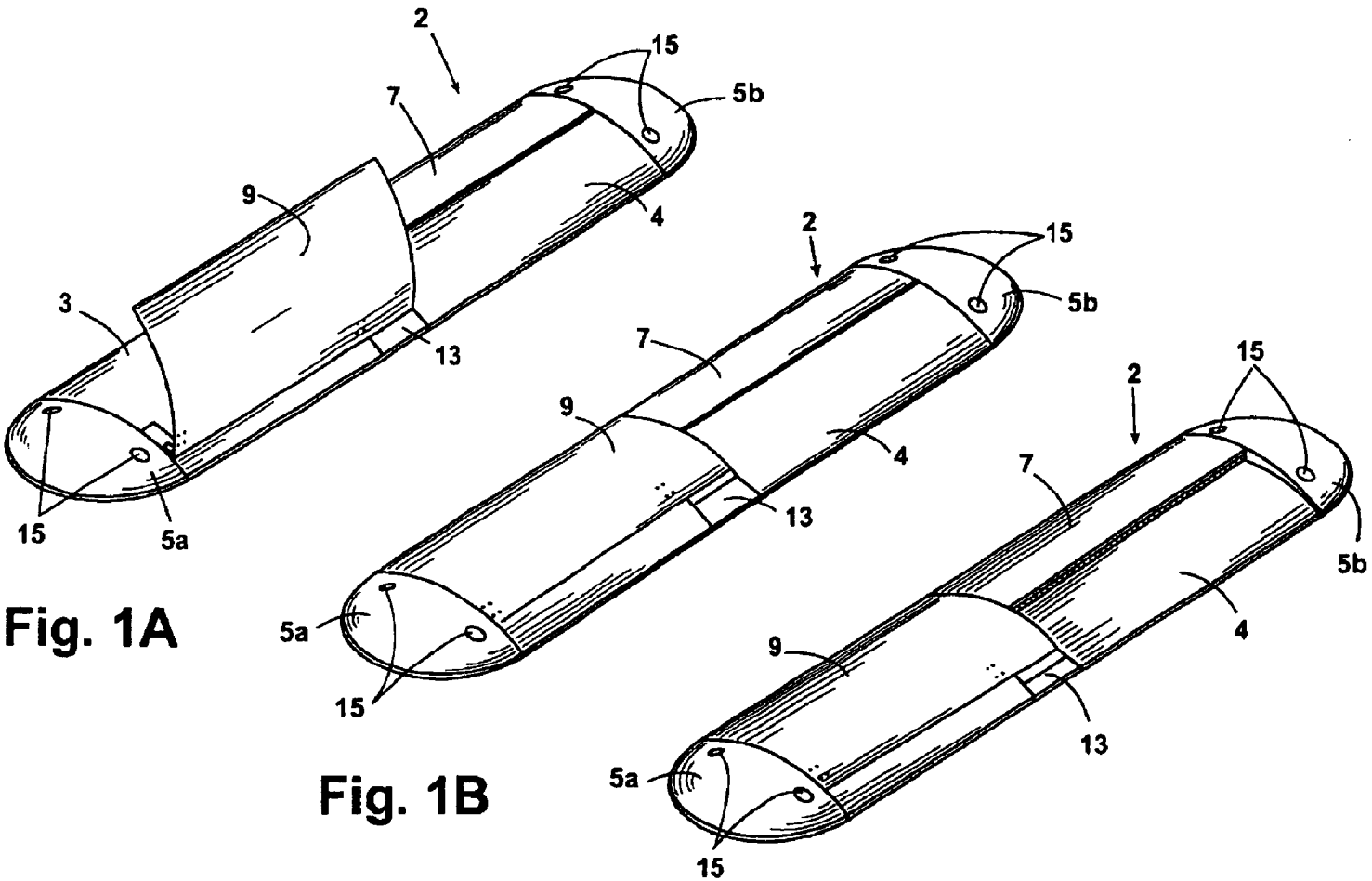
FIG. 1(a) is a top perspective view of one form of the security device of the present invention in an operative condition in which the barrier and the arming pedal are both raised.
FIG. 1(b) is a top perspective view of the device of FIG. 1(a) when in a second condition in which the barrier is lowered and the arming pedal is raised.
FIG. 1(c) is a top perspective view of the device of FIG. 1(a) when in a third condition in which both the barrier and the arming pedal are lowered.

In FIGS. 1(a), (b) and (c) there is shown one form of the parking security device generally denoted as 2 showing a framework or chassis member 3 or a modular arrangement comprising two end D-plates 5a, 5b and a cover plate 7 arranged to extend longitudinally along one side of an arming plate 4 located to one side of the device 2, and a barrier 9 located adjacent one end of arming plate 4 for movement between a raised position as shown in FIG. 1(a) and a lowered position as shown in FIGS. 1(b) and 1(c). Suitable fastening means, such as anchor bolts 15 are used at either end to securing the device 2 to the driveway entrance or similar adjacent the parking space being protected. Alternatively, adhesive may be used to stick the device to the driveway or similar.

It is to be noted that the description of the parking securing device of the present invention in the orientation described in this specification is in accordance with the normal in use orientation of the device and is adopted merely for ease of description. The normal in use front position is the position in which the barrier 9 and arming plate 4 are located along the front edge of the device and this edge is referred to as the front of the device.

The operating mechanism 11 of the device of the present invention is located in enclosure 13 of the device between arming plate 4 and barrier 9 so that it interconnects the arming pedal 4 and barrier 9. Enclosure 13 is located underneath barrier 9 when in the lowered position.

With particular reference to FIGS. 2, 3, 4 and 5, mechanism 11 comprises a base plate 8 in the form of a substantially rectangular flat plate mounted on or within an enclosure 13, a first frame member 10 (shown only in FIG. 5) located along one side edge of plate 8 and a second frame member 12 located along an opposed side edge of plate 8. It is to be noted that many components such as frame member 10 or slotted wheel 84 (introduced later) have been omitted from many of the drawings for the sake of clarity in order to see the operative components and the interrelationship.

Frame member 10 is provided with a circular recess 14, for receiving large plastic washer 16 having a flange 18 acting as a bearing for one end of main axle whereas the other frame member 12 is provided with a circular recess 24 for receiving small plastic washer 26 having flange 27 acting as a bearing for the other end of main axle 20 which extends between the two opposed frame members 10, 12 so that main axle 20 is journalled in the plastic washers 16, 26 when in apertures 14, 24. It is to be noted that main axle 20 is shown only partially in all of the figures for the sake of clarity. Axle 20 can extend on both sides of each of frame members 10, 12 or beyond only one frame member, preferably only frame member 10 and not frame member 12.

Housing 28 is provided at or towards the rear of base plate 8 and houses an electrically operated solenoid, remote control signal receiving unit, a power source such as a battery, and any other ancillary equipment required to activate the solenoid. Solenoid pin 30 which is provided with an aperture 32 at its distal end extends outwardly from housing 28 so that on operation of the solenoid in housing 28, pin 30 is momentarily retracted into housing 28 to initially operate mechanism 11. The distal end of the relative shorter arm of a generally U-shaped link pin 34 having a relatively shorter arm and a relatively longer arm is received through aperture 32. A compression spring (not shown) is optionally received over pin 30 to extend between housing 28 and the distal end of the shorter arm of link 34 when received in aperture 32 to provide a bias to return pin 30 to its at rest position after operation of solenoid to retract pin 30.

The distal end of the relatively longer arm is received through a bore provided towards the distal end of crank arm 38 of cam 40 so that movement of solenoid pin 30 causes rotation of cam 40 in a direction so that crank arm 38 moves towards housing 28. Cam 40 which is substantially annular in shape is provided with large central aperture for rotatingly locating cam 40 on main axle 20.

Cam 40 is provided with a first cam surface or lobe 42 and a second cam surface or lobe 44 at spaced apart locations around the periphery of the cam, typically at about 20° to 90° of rotation from each other.

A pair of mating discs 46, 48 are located on main axle 20 on either side of cam 40 and are each spaced from cam 40 by a washer 50 and are free to rotate in unison with axle 20 as required. One of the mating discs 46 is provided with a pair of substantially parallel spaced apart prongs 52a, 52b extending from the disc in the direction towards cam 40 and the other disc 48 which is provided with a pair of spaced apart holes 54a, 54b for receiving the distal ends of the pair of prongs 52a, 52b respectively so that when the prongs 52a, 52b are received in the holes 54a, 54b the two mating discs 46, 48 are aligned with each other. One of the prongs 52b forms an axle about which a T-catch 56 can pivot in use. T-catch 56 is in the form of an elongate stem 58 having a bar 60 located on either side of the stem to form a T-bar or optionally only one bar projecting from the stem to form an L-bar (not shown) located at one end of the stem 58. The end of the stem from which bar 60 extends acts as a cam contact portion 62. A bore is located towards the end of the stem 59 remote from the T- or L-bar so that prong 52b is received through the bore. A generally double S-shaped T-catch spring 64 comprising three alternately arranged recesses located adjacent each other and a stop located adjacent to one of the recesses provides biasing to maintain the cam contact 62 of the T-catch 56 in contact with the lobes 42, 44 of cam 40 as required. The other of the prongs 52b of the mating discs 46 is received in recess 56 of the spring recess of the T-catch spring closest to the stop to allow spring 64 to pivot in use of the mechanism 11 along with corresponding movement of the T-catch 56 while maintaining pressure of the T-catch so that the cam contact portion 62 is in contact with the lobes of cam as required.

In the normal at rest positions of cam 40 the cam contact 62 rests on part of the cam surface adjacent the lobes and adopts a relatively lower position. In use, as cam 40 rotates, bar 60 is forced to ride up along the lobe to adopt a relatively elevated position which operation will be described in more detail later in this specification.

A generally eccentric-shaped arming disc 66 is located on main axle 20 between mating disc 48 and small washer 26 by main axle 20 being received through the central aperture of the arming disc so that the arming disc is able to rotate about the main axle as required. Arming disc 66 is provided with a pawl or stop shoulder 68 located at one location around the circumference of the disc for cooperatively engaging with one side of the T-bar acting as a ratchet.

A crank arm 70 provided with a bore is provided at a further location on the circumference of the arming disc 66 at a spaced apart location from the stop shoulder 68 so that there is a depression located in the circumferential edge of arming disc 66 intermediate stop shoulder 68 and the crank arm 70. A spigot 72 is received in the aperture of the crank arm and extends outwardly from the arming disc through a generally arcuate slot 74 provided in frame member 12 for engaging with one leg 76 of a torsion spring 78 located about a stub axle 80 on the other side of the frame member 12. Spring 78 is located so that one leg 82 rests on a chassis or framework member of device 2 or on the ground or substrate upon which the device 2 is supported or is held captive by suitable means whereas the other leg 76 is in contact with spigot 72. The other end of spigot 72 is fixedly connected to arming pedal 4 so that an arming pedal 4 is depressed spigot 72 moves relatively downwardly in slot 74. As spigot 72 traverses slot 74 in a generally downwards direction in accordance with depressing of arming pedal 4, spring 78 is compressed to further develop more torsion so that it can be in a more energized condition or armed position while simultaneously causing rotation of arming disc 66 in an anti-clockwise direction. The inner or smaller diameter edge of arcuate slot 74 is provided with a cut-out or rebate 82 in its surface for receiving and holding one extreme end of bar 60 to lock the mechanism against rotation as will be described in more detail later.

Returning now to the other end of main axle 20, a slotted wheel 84 is located on main axle 20 intermediate mating disc 46 and the large washer 16 received in circular recess 14 in frame member 10. Slotted wheel 84 is provided with a groove or recess 86 at one point in its circumference for receiving the other extreme end of bar 60 or the slotted wheel may be connected to the bar by any other suitable means so that the bar is fixedly connected to the slotted wheel and both rotate in unison about main axle 20 as required.

Collar 112 is securely attached to plate 8 such as by welding at a position near to cam 40 for receiving axially slidable manual release push rod 114. Collar 112 locates the main part of push rod 114. This arrangement allows slidable movement of rod 114 in use to manually operate the mechanism 11 in the event of a power failure, such as for example a flat battery or the like. The proximal end of push rod 114 pushes against crank arm 38 of cam 40 in the direction towards housing 28 thereby providing for manual operation of the security device in the event of failure of the remote control. Of course, the cover of enclosure 13 or barrier 9 will need to be removed from the device or raised respectively before access can be gained to mechanism 11 to push the push rod. Cover 116 provided with aperture 118 through which the distal and of push rod 114 extends for access from outside the cover is provided to protect mechanism 11 in use from damage or the effects of dirt or water. Ring 110 is provided on the distal end of push rod 114 to prevent rod 114 from slipping axially out through aperture 118.

Figure 2:
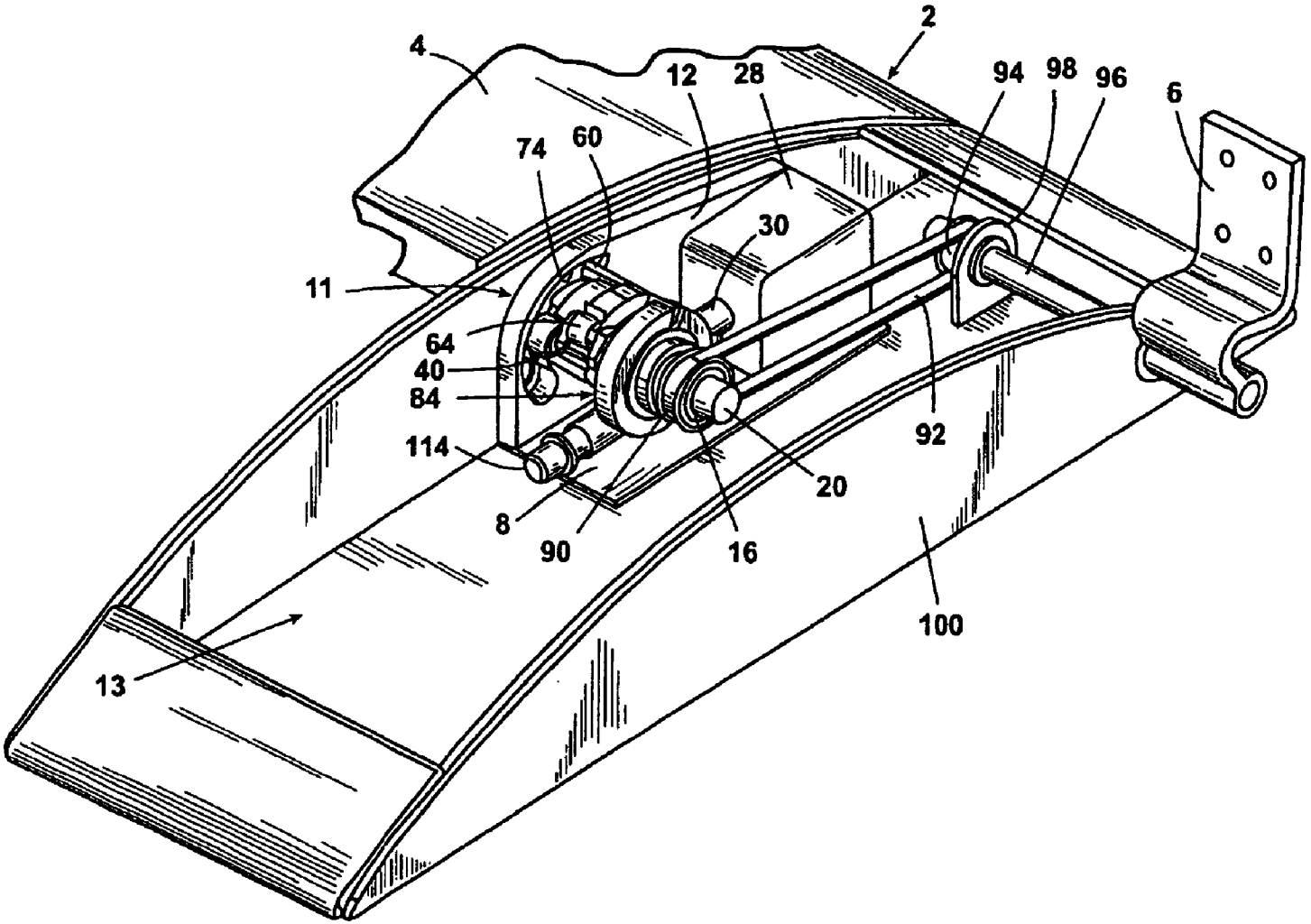
FIG. 2 is an enlarged top rear side perspective view of part of the mechanism of FIGS. 1 in which the barrier is in a raised position.
Figure 3:
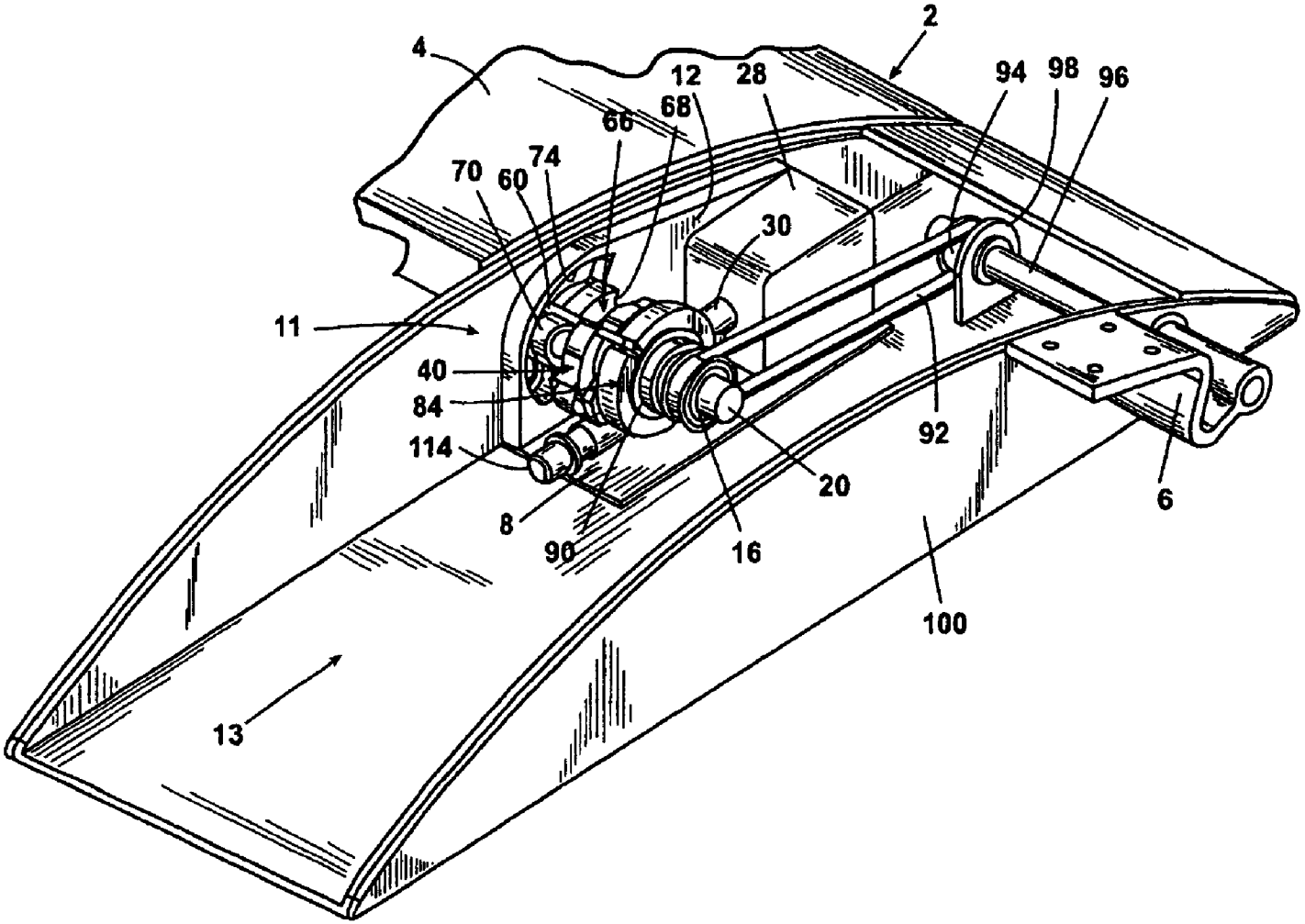
FIG. 3 is an enlarged top rear side perspective view of part of the mechanism of FIG. 1 in which the barrier is in a lowered position.
Figure 4:
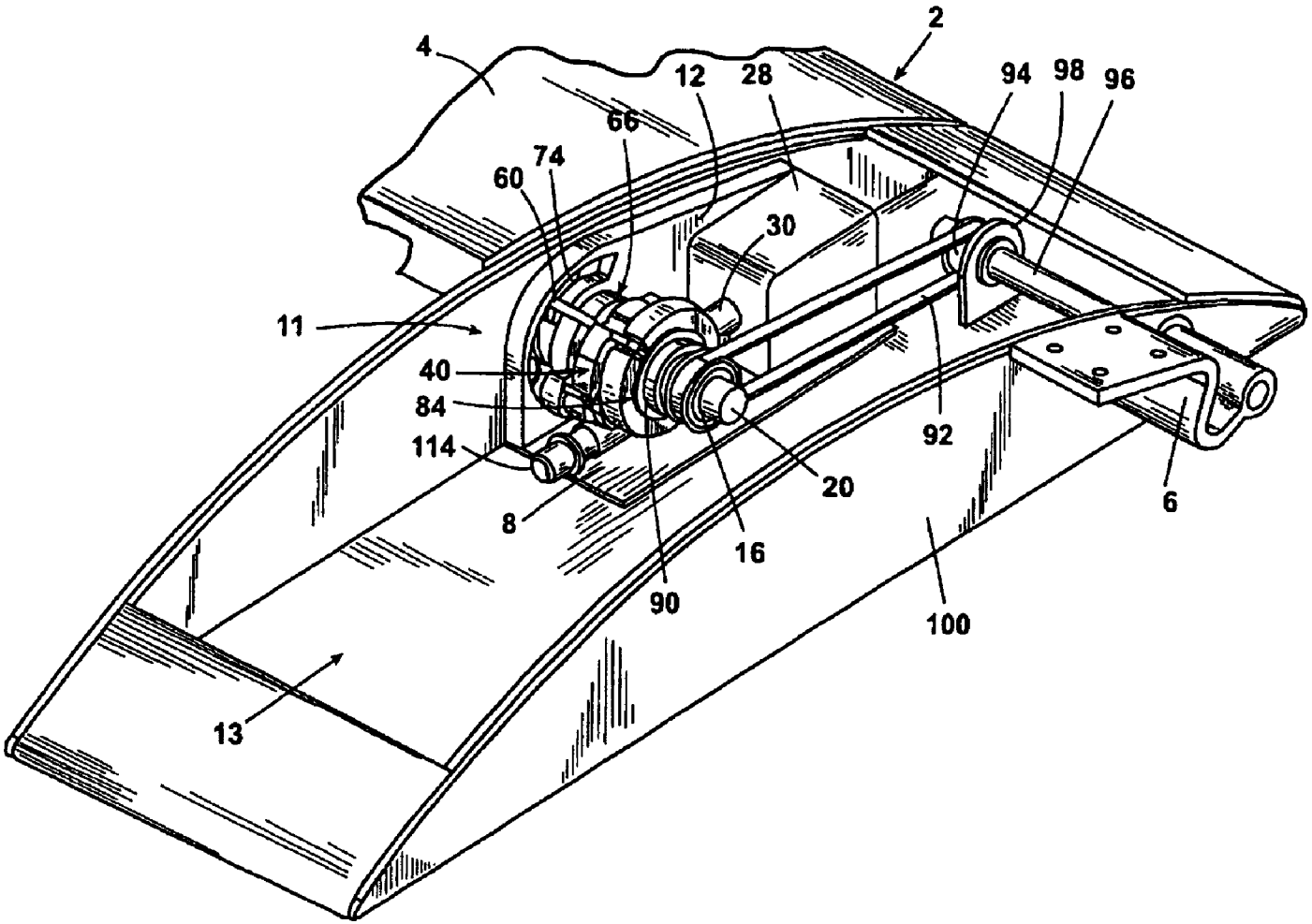
FIG. 4 is an enlarged top rear side perspective view of part of the mechanism of FIG. 1 when in an armed or energized condition.
Figure 5:
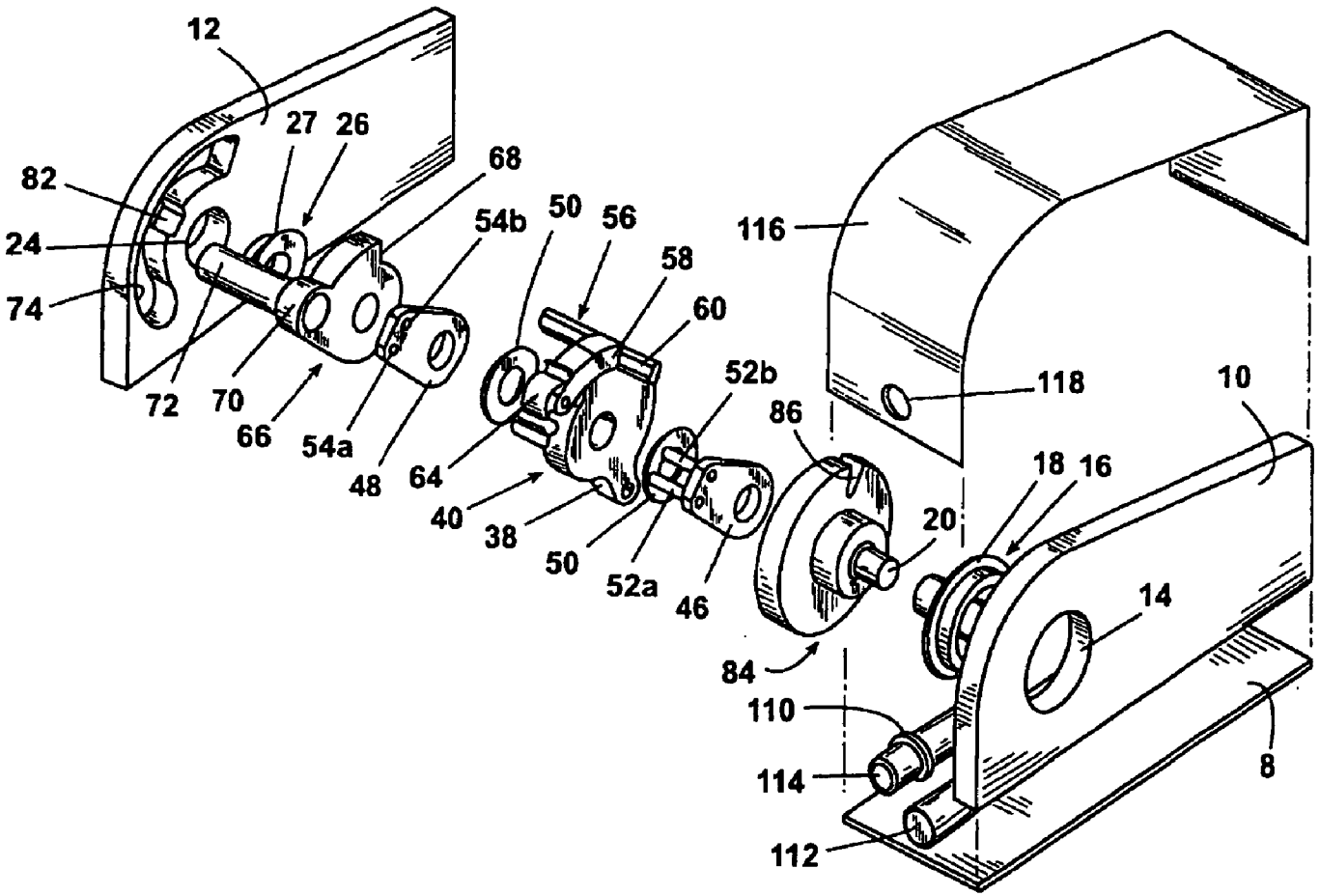
FIG. 5 is an exploded rear view of the main components only of the actuating mechanism of FIG. 1 shown in isolation.

With particular reference to FIGS. 2, 3 and 4 in which frame member 10 has been omitted so that the components of mechanism 11 can be seen more clearly, there is shown a pulley wheel 90, received on axle 20, which pulley wheel 90 is located on the other side of frame member 10 as axle 20 extends beyond frame member 10. Pulley wheel 90 is connected to axle 20 for rotation in accordance with corresponding rotation of slotted wheel 84 as mechanism 11 operates. A pulley belt 92 is received on pulley wheel 90 and around a further pulley wheel 94 which is mounted on rotating shaft 96 which in turn is received through and journalled in a support bracket 98 mounted to the bottom of the device 2 within enclosure 13 containing mechanism 11. The other end of shaft 96 is received through and journalled in an aperture located in an and plate 100. Bracket 6 or similar is fixedly connected to the end of shaft 96 which extends beyond end plate 100 to move in accordance with rotation of the shaft. In one embodiment barrier 9 is connected to bracket 6 which can be moved between the raised and lowered positions, say through about 90° rotation or less in accordance with corresponding rotation of slotted disc 84 and pulley wheel 90.

Figure 6:
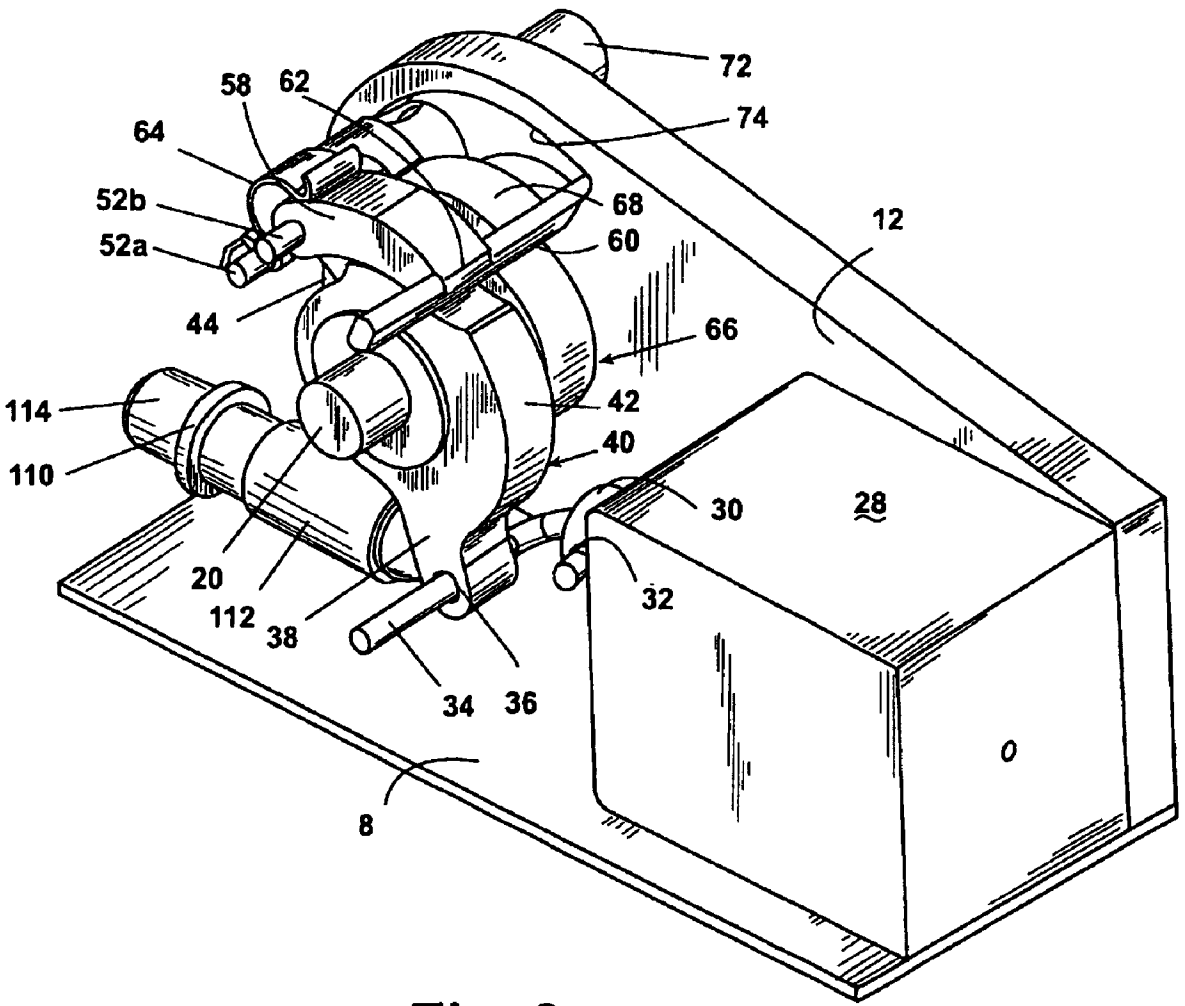
FIG. 6 is a more detailed partial top front perspective view of the mechanism of FIG. 1 when the barrier is in the raised position but omitting some components.
Figure 7:
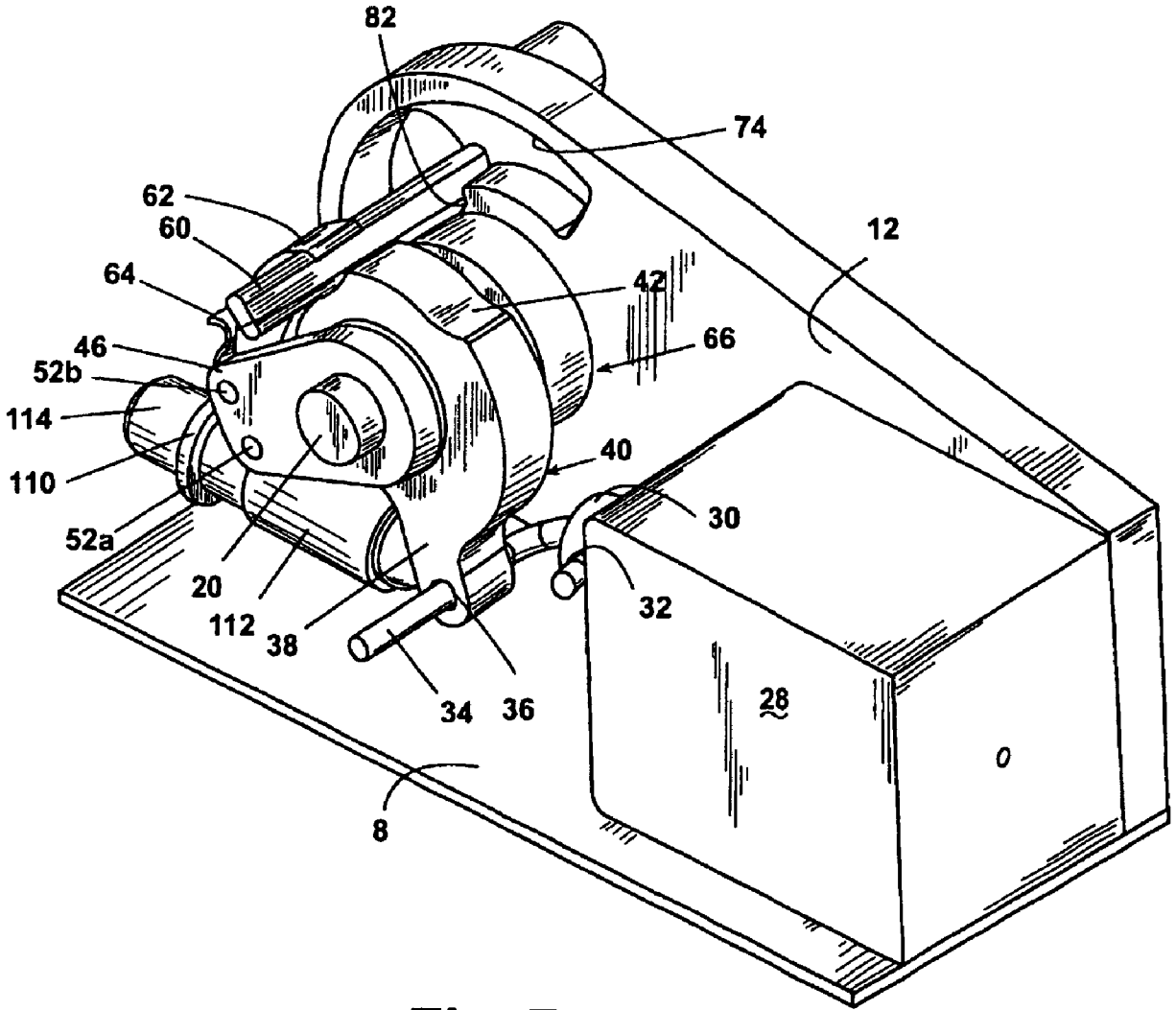
FIG. 7 is a more detailed partial top front perspective view of the mechanism of FIG. 1 when the barrier is in the lowered position.
Figure 8:
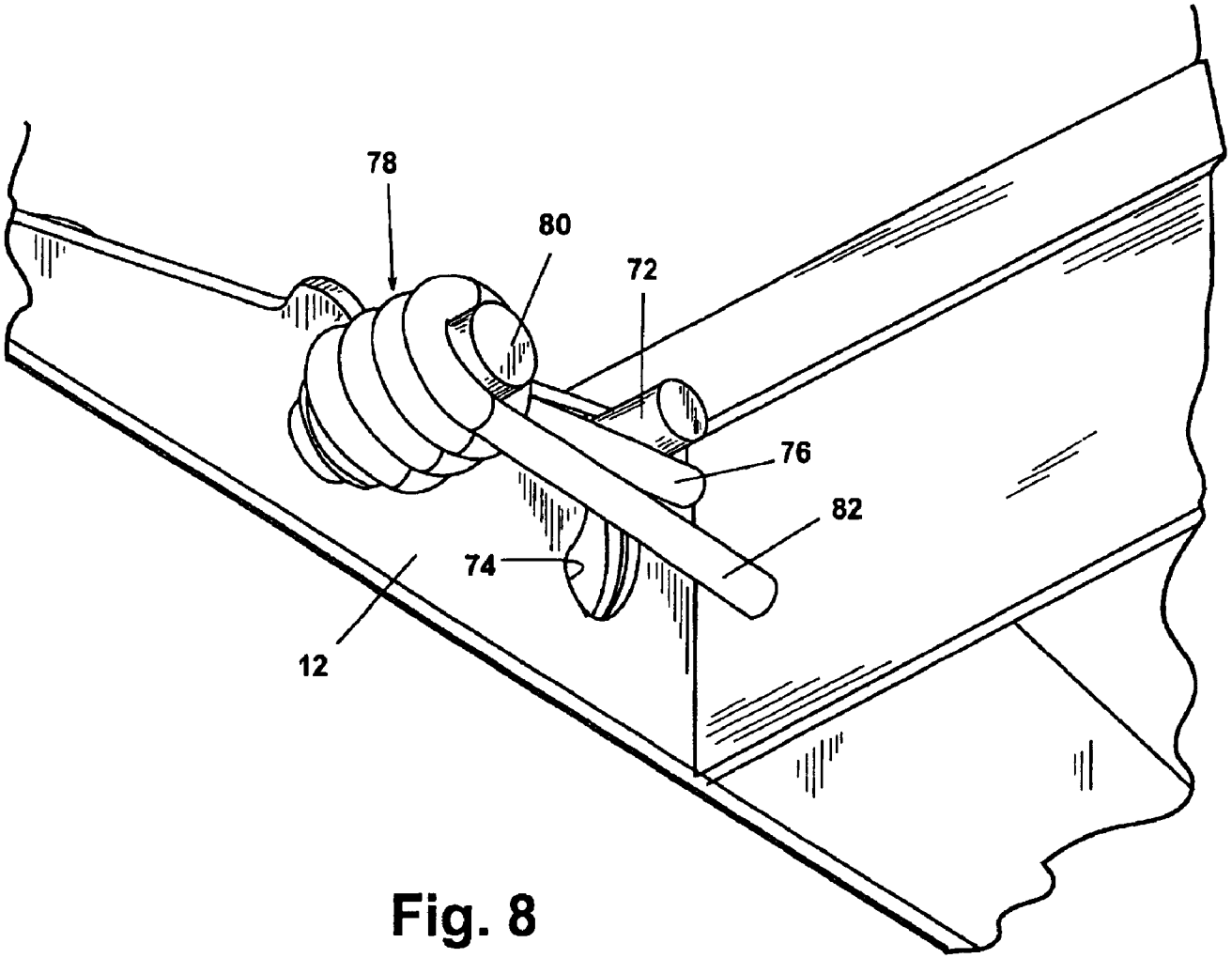
FIG. 8 is a bottom front other side perspective view of the torsion spring and spigot of the mechanism of FIG. 1.

Operation of the security parking device of the present invention will now be described with particular reference to FIGS. 6 and 7 from which many of the components have been omitted for the sake of clarity, particularly the components arranged from the slotted wheel 84 to bracket 6 inclusive.

Device 2 of the present invention is securely located on the road, driveway, path or similar to protect the entrance to the parking space being protected so that as a vehicle is driven into the parking space it passes over the device just before entering the designated parking place. When the barrier 9 of device 2 is in the raised position, one end of bar 60 is located in slot 96 of slotted wheel 84 (as it always is) to provide connection therebetween and transmit motion, the cam contact portion 62 of bar 60 rests just above the approach to first lobe 42 of cam 40 and the mid portion of the other end of bar 60 abuts against shoulder stop 69 of arming disc 66 with the extreme end of the bar 60 abutting against the upper end of the inner surface of arcuate slot 74 of frame member 12 so that the slotted wheel 84 is secured in this position.

As the vehicle approaches the parking spot with the barrier 9 in the raised position, a remote control transmitter or unit is operated thereby sending a signal to a receiver located within housing 28 together with a suitable power source such as a battery which provides energy for operation of solenoid to retract solenoid pin 30 within housing 28. As pin 30 retracts, link 34 is moved towards housing 28 thereby rotating crank arm 38 of cam 40 towards the housing 28 which in turn permits the bar 60 of the catch 66 to ride up along the first lobe 42 thereby releasing the end of the bar 60 from the shoulder stop 68 thus releasing the slotted wheel 84 to rotate in an anti-clockwise direction under the effect of gravity on the barrier as it slowly falls to the lowered position under its own weight. As barrier 9 moves to the raised position because it is connected to T-catch 56 via slotted wheel 84, bracket 6, shaft 96, pulley 92 and pulley wheel 90, 94, it causes catch 56 to rotate anti-clockwise (away from the front of device 2) until the barrier comes to rest in the fully lowered position which allows a vehicle to be driven over device 2. When barrier 9 is in this position the bar 60 has moved to be located in the depression between the shoulder stop 68 and crank arm 70 of arming disc 66.

As the barrier is lowered, the vehicle may be driven over it into the parking space and also over arming pedal 4 which is connected via spigot 72 to arming disc 66 and spring 78. As the vehicle passes over the arming pedal 4 it is depressed further towards the ground against the bias of torsion spring 78 which is put into compression by the action. As spigot 72 is forced to move within arcuate slot 74 due to the depression of arming pedal 4, the arming disc 66 is rotated anti-clockwise until the shoulder stop 68 rotates past and under the bar 60 to clear the bar whereupon the bar is pushed down by spring 64 to engage against the shoulder stop to prevent its counter-rotation. As the extreme end of the bar 60 is held in the rebate 82 in the inner surface of the arcuate slot 74 the mechanism is prevented from moving while the arming disc rotates anti-clockwise past the bar about axle 20. Even though the shoulder stop 68 is hard against the bar and under pressure from the torsion spring now in its maximum energized state to rotate clockwise (in the counter direction), it is prevented from doing so by the extreme end of bar 60 being located in rebate 82 and shoulder stop 68 abutting against bar 60. When the mechanism is in this condition it is said to be in the armed state or energized condition and has maximum potential for further movement, such as to raise the barrier and arming pedal when required.

As cam 40 is more or less fixed because it is connected to the solenoid pin 30 by link 34, when bar 60 falls with the barrier, cam contact portion 62 of bar 60 adapts a position on the approach to second lobe 44. Thus, the second lobe can release the stored energy to raise the barrier when required.

When the vehicle passes over the device 2, either entering the parking space or exiting the parking space, and the barrier is to be closed, the remote transmitter is operated so that the solenoid pin 30 is retracted into housing 28.

On retraction of the solenoid pin, crank arm 38 of cam 40 is rotated towards housing 28 which in turn moves second lobe 44 which forces the cam contact portion 62 of bar 60 to ride up second lobe 44 so that the extreme end of bar 60 is released from being held captive in rebate 82. As there is now no longer a restraining force on torsion spring 78 on its release, spigot 72 moves in arcuate slot 74 in a clockwise (upward) direction which in turn allows arming pedal 4 to return to its normal elevated (less depressed) position. Because bar 60 is abutting against the shoulder stop 68, as the arming disc 66 rotates (clockwise) it forces bar 60 to correspondingly rotate until the extreme end of bar 60 contacts the upper end of arcuate slot 74 simultaneously with the base of the barrier hitting the surface of chassis member 3 which prevents further clockwise rotational movement. Since bar 60 is received in slot 86 of slotted wheel 84, as bar 60 moves so does the slotted wheel 84 until it comes to rest, where the cam contact 62 of bar 60 takes up a position on the approach to the first lobe 42. Simultaneously, the barrier is forced to rise since it is connected to the slotted wheel 84 through the pulley sub-assembly as previously described. When the barrier is fully raised the mechanism is in a condition ready for a further cycle of operation with self weight of the sign in equilibrium with the slight compression of the torsion spring 78. Bar 60 is now resting against the shoulder stop 69 and the cam contact 62 of the bar sitting on the approach to the first lobe 42.

Advantages of the present invention include a low cost, self-contained, compact, reliable parking securing device for use in providing economical and flexible protection for a designated parking area. Other advantages of the present invention include the following:

- the device is relatively inexpensive to manufacture;
- the device is robust and can be made to an aesthetically pleasing design,
- the installation process is simple and can be carried out by a person of minimal mechanical skill;
- the device can be made fully automatic;
- the arming pedal enables the device to harness the energy of a motor vehicle driven over the device so that the device does not rely on external power to arm,
- because the arming pedal harnesses the energy of a motor vehicle, only a minimal amount of external power is required to operate the device—a power source as small as a 6 or 9 volt battery may be sufficient to operate the device;
- the device can be designed to give effective frontal and lateral barrier to provide superior coverage of the parking place.

The described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

What is claimed is:

1. A security device able to control movement of a vehicle to and from a designated parking area comprising:

a barrier capable of movement between a first position for preventing movement of a vehicle past the barrier and a second position for allowing movement of a vehicle past the barrier;

a controller for selectively controlling operation of the barrier between the first and second positions;

a driver for effecting movement of the barrier from the second position to the first position in response to a selective operation of the controller; and an arming means for arming the driver for effecting movement of the barrier from the second position to the first position in response to selective operation of the controller when the arming means is in the armed condition, said arming means being movable from an unarmed position to the armed position to arm the driver by movement of the vehicle over the security device, wherein a first operation of the controller causes the driver to move the barrier from the second position to the first position substantially simultaneously with the arming means moving from the armed position to the unarmed position thereby disarming the arming means, and a second operation of the controller allows the barrier to move from the first position to the second position while the arming means remains in the unarmed position, and wherein movement of the vehicle over the security device when the arming means is in the unarmed position [moves the barrier] *arms the driver* for future movement *of the barrier* from the second position to the first position.

2. A security device according to claim 1, further comprising a chassis or framework member on which the arming means, controller, driver and barrier are mounted, said chassis or framework capable of being securely attached to a substrate in a desired location to protect the designated parking area.

3. A security device according to claim 1, wherein the barrier comprises any one of a plate, shield, sign or similar of a substantially curved profile in its transverse direction so that when in the lowered position the barrier forms a hump or similar which can be readily driven over without the vehicle sustaining damage, and the arming means is of a profile similar to the barrier.

4. A security device according to claim 1, wherein the controller further comprises a remote control device for remotely providing a signal to effect operation of a solenoid which in turn effects operation of the driver or barrier in use.

5. A security device according to claim 1 in which the first position of the barrier corresponds to the barrier being in a raised position and the second position of the barrier corresponds [tot he] *to the* barrier being in a lowered position, and the arming position corresponds to the arming means being in one of a lowered or depressed position and the unarmed position corresponds to the arming means being in the raised position.

6. A security device according to claim 5 capable of adopting a number of conditions in use, including:

a first condition where the barrier and arming means are both in raised positions thereby preventing movement of the vehicle past the barrier;

a second condition where the barrier is lowered while the arming means is raised thereby allowing movement of the vehicle past the barrier; and a third condition where the barrier and arming means are both lowered, whereby passage of the vehicle over the security device when in the second condition arms the arming means by lowering the arming means thereby arming the driver in readiness for movement of the barrier to the raised position in response to the first operation of the controller, wherein said arming means remains in the lowered position pending movement of the barrier to the raised position for movement to the first condition.

7. A security device according to claim 1, wherein the arming means is one of a pedal, lever, arm, plate or similar connected to a spring and arranged so that as the vehicle drives over the arming means increased compression is applied to the spring by depression of the arming means.

8. A security device according to claim 7, wherein the arming means moves between the lowered position and the raised position by rotation about an axle under the influence of the spring.

9. A security device according to claim 7, the arming means is provided with a biasing means and the spring means is the driver as well as the biasing means for the arming means.

10. A security device according to claim 7, wherein the spring causes the barrier to rise simultaneously with the arming means returning to the raised position in response to the first selective operation of the controller.

11. A security device according to claim 10, wherein the arming means is connected to the barrier by at least a part of the controller so that movement of the controller effects operation of the device wherein the controller includes a cam arrangement and an interconnecting means.

12. A security device according to claim 11, wherein the cam arrangement includes a cam having two cam lobes in which the first of the cam lobes controls movement of the barrier from the raised position to the lowered position whereas the second of the cam lobes controls movement of the barrier from the lowered position to the raised position along with controlling movement of the arming means from the lowered position to the raised position.

13. A security device according to claim [11] *5*, wherein the arming means is located adjacent the barrier and the interconnecting means includes a releasable connecting means connecting the arming means and the barrier such that the arming means and barrier rise in unison.

14. A security device according to claim 13 wherein the releasable connecting means comprises one of a lock, latch, spring biased pin, or similar which is engaged when the arming means reaches one of the lowered or depressed state.

15. A security device according to claim 13, arranged so that when the arming means is returned to the lowered position by the passage of a vehicle past the security device, the connecting means is engaged or activated so as to reconnect the barrier to the arming means.

16. A security device according to claim 1, further comprising a locking means so that when the barrier and arming means are both in the raised position, both held in position by the locking means.

17. A security device according to claim 16, wherein locking means prevents movement of the barrier from the raised position to the lowered position.

18. A security device according to claim 17, the locking means includes a pawl and ratchet arrangement in the form of a bar and rebate combination in which the bar is capable of being selectively received in the rebate.

19. A security device according to claim 18, wherein the second operation of the controller when the barrier and arming means are both in the raised position, involves release of the connecting means and the locking means thereby allowing the barrier to move from the raised position to the lowered position.

20. A security device according to claim 19, further comprising a releasable barrier retaining means arranged so that when the barrier reaches the fully lowered position, the barrier engages the releasable barrier retaining means to retain the barrier in the lowered position.

21. A security device according to claim 20, wherein release of the barrier retaining means releases tension in the spring to raise the arming means and the barrier.

22. A security device according to claim 8, wherein the spring is attached to one of the axle to rotate the arming means about the axle, or a remote location for rotating the arming means about the axle.

* * * * *